United States Patent [19]

Cohen

[11] Patent Number: 5,040,986
[45] Date of Patent: Aug. 20, 1991

[54] EDUCATIONAL DEVICE FOR TEACHING HANDWRITING SKILLS

[76] Inventor: Martha G. Cohen, 18 W. Valley Brook Rd., Long Valley, N.J. 07853

[21] Appl. No.: 518,798

[22] Filed: May 4, 1990

[51] Int. Cl.⁵ .............................................. G09B 11/00
[52] U.S. Cl. .................................... 434/162; 33/27.03
[58] Field of Search ..................... 434/81, 85, 87, 88, 434/464, 162–166; 33/27.01–27.07, 18.1, 1 M, 42, 430, 162, 565, 214, 564

[56] References Cited

U.S. PATENT DOCUMENTS

| | | | |
|---|---|---|---|
| 3,363,338 | 1/1968 | Skinner et al. | 434/162 |
| 3,382,592 | 5/1968 | Lucero | 434/162 |
| 4,822,284 | 4/1989 | Cohen | 434/162 |

*Primary Examiner*—Richard J. Apley
*Assistant Examiner*—Glenn Richman
*Attorney, Agent, or Firm*—McAulay Fisher Nissen Goldberg & Kiel

[57] ABSTRACT

An educational device is disclosed for teaching children handwriting skills. The device includes a tablet which supports a sheet-like member having an inscribable surface. A clutch assembly is mounted to the tablet for rotation only in a clockwise direction about an axis of rotation. A transparent control plate is mounted to the clutch assembly for rotation therewith. The plate includes a plurality of apertures adapted to receive a writing implement. Each of the apertures is located at a different radial distance from the axis of rotation and is angularly displaced from each of the other apertures. An overlying plate is mounted to the tablet and positioned to cover at least half of the rotatable control plate. The overlying plate has an edge that lies across the rotatable plate. In operation, a writing implement is received in the apertures and serves to inscribe a plurality of concentric arcs on the sheet-like member during rotation of the control plate about the axis of rotation, thereby instilling a habit in the child of drawing arcs in a clockwise direction.

18 Claims, 3 Drawing Sheets

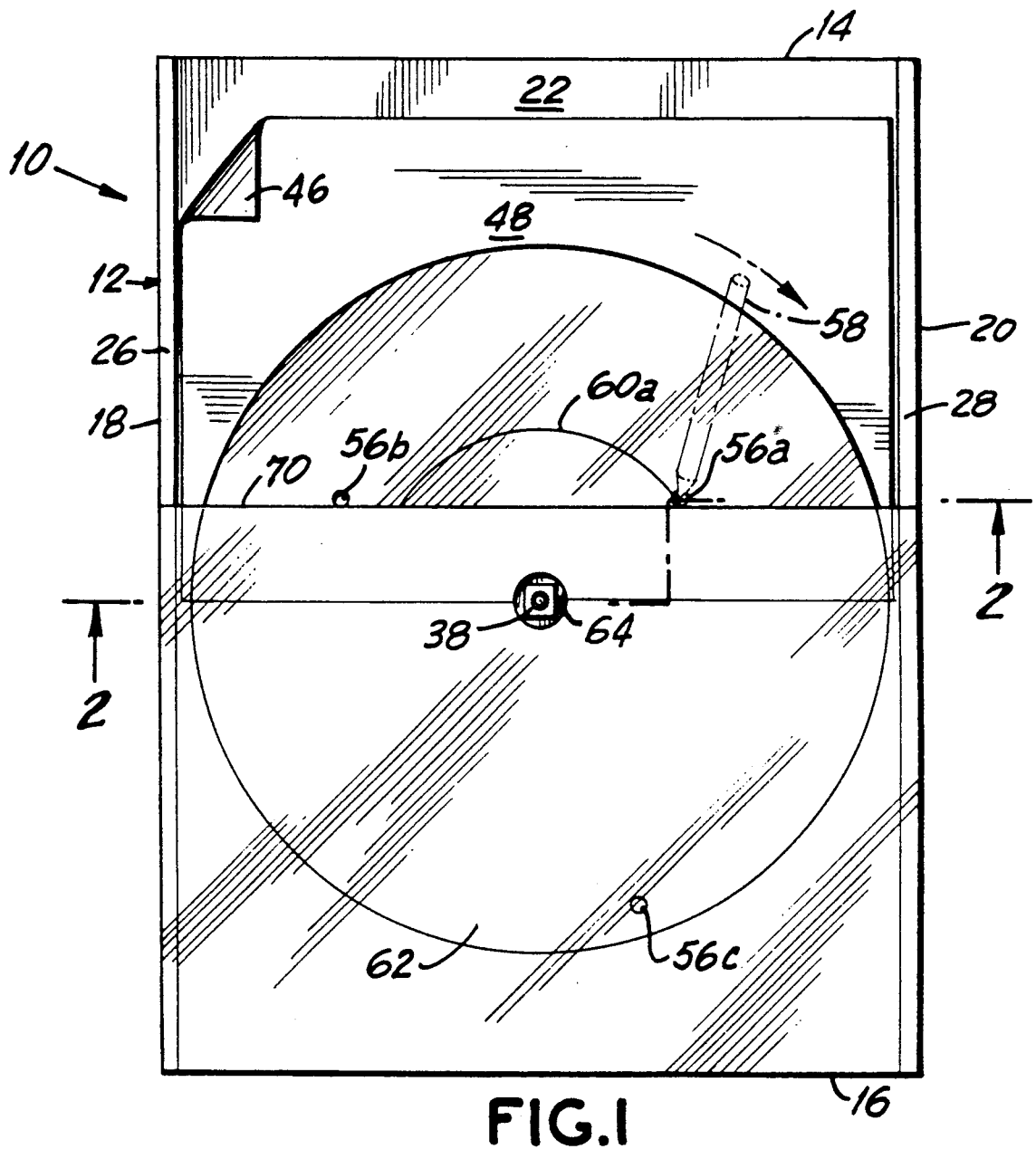
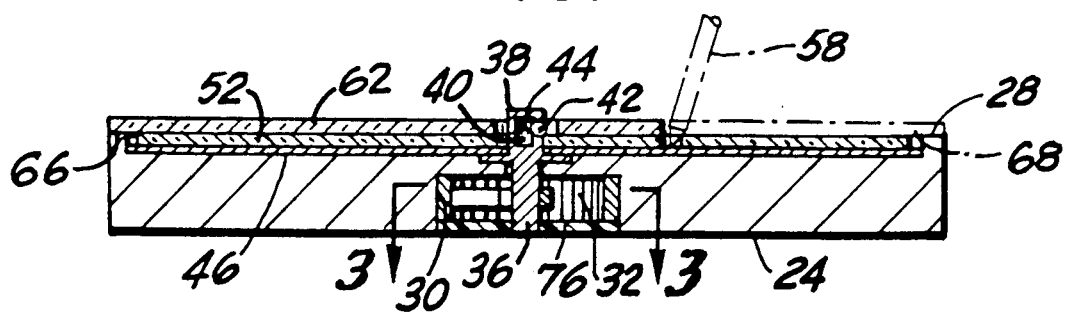

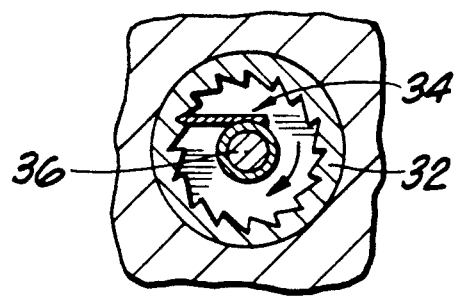
FIG. 3
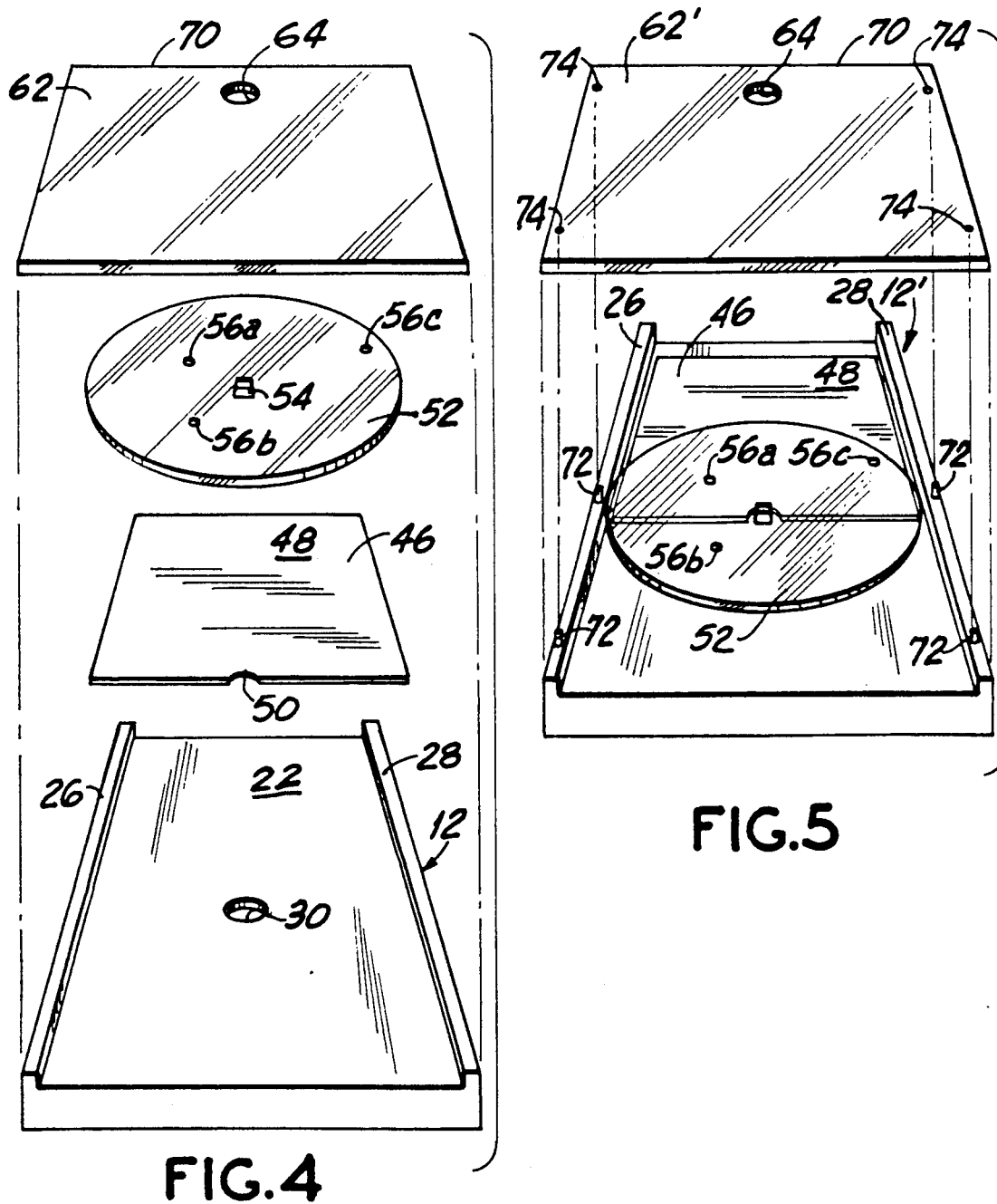
FIG. 4
FIG. 5

EDUCATIONAL DEVICE FOR TEACHING HANDWRITING SKILLS

BACKGROUND OF THE INVENTION

1. Field of the Invention

This invention related generally to an educational device for teaching handwriting skills and, more specifically, to a teaching aid designed to help children make curved lines in the form of arcs in a clockwise direction necessary for correct numeral formation.

2. Description of the Prior Art

Various devices are known for use in teaching handwriting skills. One of such devices is the appliance disclosed in U.S. Pat. No. 4,822,284 dated Apr. 18, 1989 issued to Martha G. Cohen, the same party identified as the applicant herein. The appliance of this patent serves to instill a habit in young children of drawing circles in a counterclockwise direction. This, in turn, assists the child in correctly forming certain letters of the alphabet.

It is also known that children should be taught to write certain numerals, such as "2", "3", and "5", by drawing curved lines in the form of arcs in a clockwise direction. The objective of such handwriting instruction is to establish a motor pattern for writing which becomes so automatic that it is unnecessary to concentrate on the formation of individual numbers. It is important for the child to see what he or she is drawing or writing to develop visual-motor integration in working with writing utensils. The tools or materials selected for use should be of the kind from which good visual feedback can be obtained, and which permit the visual-motor patterns to be reinforced by repetition.

Heretofore, stencils and templates have been used as tools to reinforce the teaching techniques in drawing geometric shapes, and in writing various numbers. Such tools, in conjunction with verbal instructions, help children establish visual-motor integration, and develop a smooth flow of writing. Children that are educationally handicapped, or have difficulty in visually comprehending the handwriting instruction, demonstrate good progress when taught to make the appropriate visual-motor associations.

The present invention improves on the aforesaid teaching techniques by providing a more durable and lasting device, as compared to known stencils and templates, which can be used as an adjunction to verbal or visual instructions.

SUMMARY OF THE INVENTION

The educational device of the present invention includes a planar tablet having a surface which supports thereon a sheet-like member having an inscribable surface. An overrunning clutch having a spindle is mounted to the tablet and is oriented to permit rotation of the spindle in a clockwise direction about an axis of rotation.

A rotatable transparent planar control plate or disc is provided having a bore or opening therethrough which is configured to receive the spindle of the clutch to prevent any significant relative rotation therebetween, and to permit rotation of the plate only in a clockwise direction. The plate, thus, is removably mounted to the clutch, with the sheet-like member sandwiched between the tablet and the rotatable plate.

The control plate is formed having a plurality of apertures therethrough, each configured to receive a writing implement operable to inscribe an arc on the inscribable surface of the sheet-like member as the plate rotates about the axis of rotation. Each of the apertures is located at a different radial distance from the axis of rotation and is angularly displaced from each other.

An overlying plate is fixedly mounted to the tablet and is positioned to cover more than half of the rotatable plate or disc. The mounting configuration is such that the overlying plate has a edge that lies across the rotatable plate.

The apertures in the rotatable control plate are configured to receive a writing implement, such as a pencil. In use, the child inserts the pointed end of the pencil through a selected one of the apertures in the plate, thereby to inscribe an arc on the inscribable surface of the supported sheet-like member during rotation of the plate about the axis of rotation. The plate is rotated by means of the manual manipulation of the pencil, thereby instilling a habit in the child of drawing the arc in a clockwise direction.

The drawing of such arc serves to locate the selected aperture adjacent to the edge of the fixed plate at the termination of the drawn arc, and makes available for use a second one of said apertures which is now located adjacent to the edge of the fixed plate at the beginning of the line inscribable by the second aperture. The child thus goes from one aperture to the next available aperture thereby to draw a plurality of concentric arcs, simulating a rainbow design, all drawn in a clockwise direction.

Additional features and advantages of the present invention will become more apparent from a consideration of the following detailed description when taken in conjunction with the accompanying drawings.

BRIEF DESCRIPTION OF THE DRAWING

FIG. 1 is a top plan view of the educational device constructed in accordance with the present invention;

FIG. 2 is a sectional view taken along line 2—2 of FIG. 1;

FIG. 3 is a sectional view taken along line 3—3 of FIG. 2;

FIG. 4 is an exploded perspective view of the assembled elements of the preferred embodiment of the invention;

FIG. 5 is a perspective view of substantially all of the assembled elements and showing an alternative embodiment for mounting the overlying plate to the planar tablet.

DESCRIPTION OF THE PREFERRED EMBODIMENTS

Figure 6:
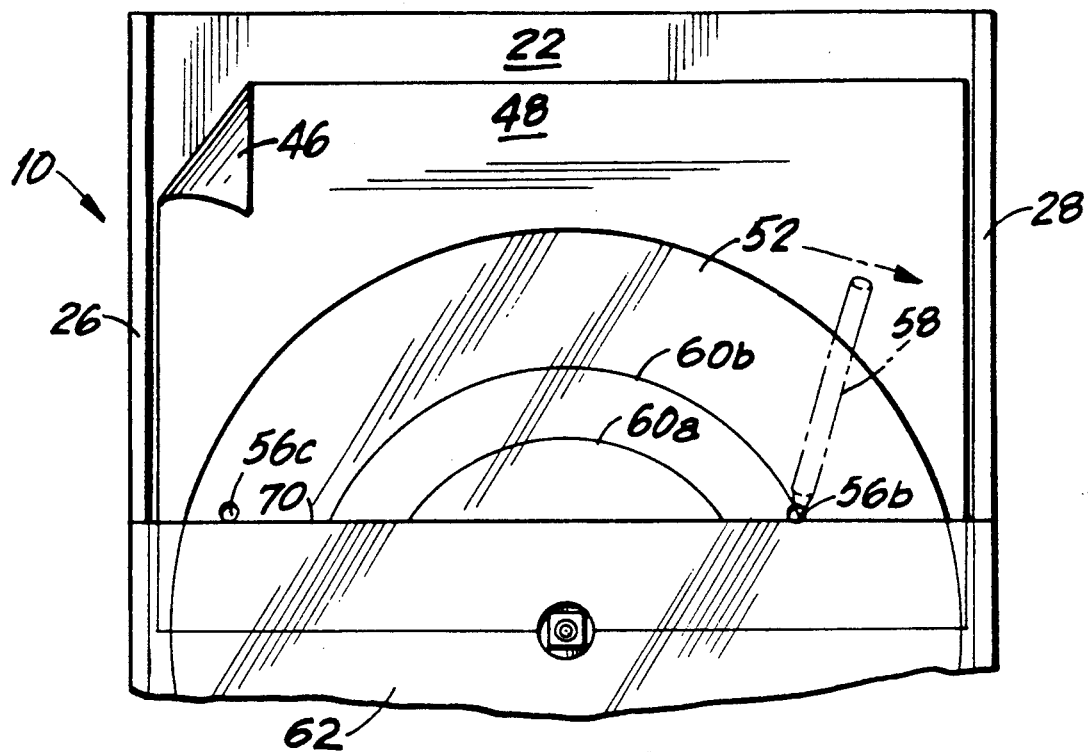
FIGS. 6 and 7 are partial plan views, similar to FIG. 1, showing the formation of a plurality of concentric arcs on the sheet-like member, all drawn in a clockwise direction.
Figure 7:
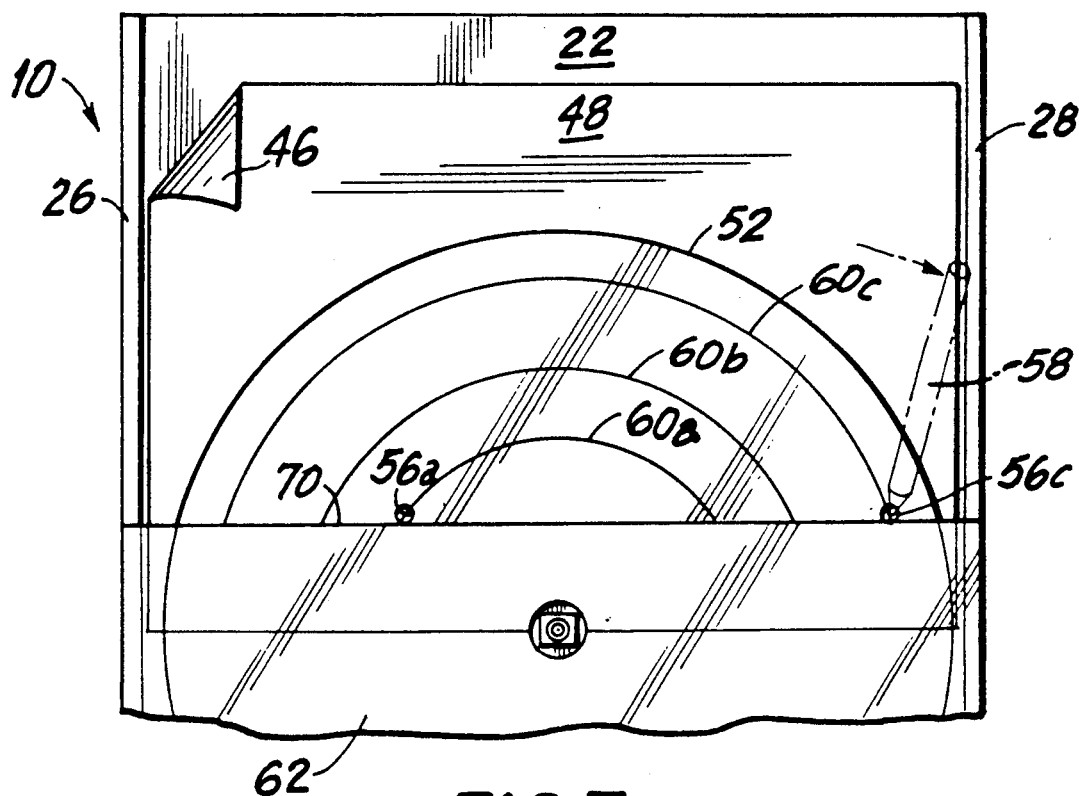

Referring to the drawings, numeral 10 represents an educational device for use in teaching handwriting skills. Device 10 includes a planar tablet 12 having an upper edge 14, a lower edge 16, side edges 18 and 20, respectively, a top support surface 22 and a bottom surface 24. The side edges 18 and 20 project upwardly above the plane of support surface 22 to define raised flanges 26 and 28, respectively. The raised flanges serve as a guide for locating a sheet-like inscription member on said support surface in the manner hereinafter described.

A bore 30 is formed in tablet 12 defining an enlarged portion in the bottom surface 24 which extends upwardly for approximately two-thirds the height of the tablet, and then reduces in size at the top support surface 22 of said tablet. The enlarged portion of bore 30 is configured to receive an overrunning clutch 32. The clutch incorporates a ratchet mechanism represented, generally, by numeral 34 in FIG. 3. Activation of clutch 32 produces a clicking sound through operation of the ratchet mechanism 34 in a manner well known in the art.

Clutch 32 also includes a spindle 36 which is operatively connected to the ratchet mechanism 34 for rotation therewith. The ratchet mechanism 34 may be selectively oriented to permit rotation in either a clockwise or counterclockwise direction about an axis of rotation. For present purposes, the mechanism is set to permit orientation only in a clockwise direction. As such, the clutch 32 and its connected spindle 36 may be defined as being oriented for rotation only in a clockwise direction as viewed from the top; that is, in the direction of the arrow when viewed looking at FIG. 1.

Spindle 36 extends upwardly from clutch 32 and projects through the reduced sized portion of bore 30. This serves to locate the top or free end 38 of spindle 36 above the plane defined by support surface 22. The surface of spindle 36 adjacent its free end 38 is formed having an opening 40 configured to receive an outwardly biased retractable bearing element 42. The element is normally displaced, under influence of a spring 44, to a projected position, as shown in FIG. 2, to releasably retain a separate rotatable member on said spindle 36 in a manner hereinafter described.

Supported on the top support surface 22 of tablet 12 is a sheet-like member 46, such as ordinary writing paper, having an inscribable surface 48. An enlarged opening or cut-out 50 is formed in member 46 through which freely passes the spindle 36 of clutch 32 when member 46 is positioned on support surface 22. As previously noted, the raised flanges 26 and 28 of tablet 12 guide member 46 in place.

A rotatable member 52 in the form of a transparent planar control plate of disc is provided having an opening or bore 54 which is configured to permit passage of spindle 36 therethrough thereby to sandwich the writing sheet 46 between said plate 52 and tablet 12.

Plate 52 is mounted to tablet 12 by locating the central bore opening 54 over the upwardly projecting spindle 36 of clutch 32. As the plate is lowered in place, the inner wall surface which defines said bore engages the bearing element 42 in spindle 36 and displaces said element to a retracted position against the force of spring 44. Thereafter, as the plate 52 moves past element 42, the element returns to its outwardly biased projected position. This serves to locate the outermost edge of element 42 in a position which overlies an edge portion of the plate which defines bore 54, as shown in FIG. 2, to releasably retain plate 52 in place on spindle 36.

It will be appreciated that it is intended for the plate 52 to be removably connected to clutch 32, by means of spindle 36, so that plate 52 rotates only in a clockwise direction. Accordingly, the central bore 54 in plate 52 is configured in such manner as to receive the spindle 36 and prevent any significant or relative rotation between said plate and spindle. This is achieved by making the internal surfaces which define bore 54 of a shape complementary to the shape of the outer surfaces of spindle 36.

Control plate 52 is formed having a plurality of apertures 56 therethrough, each configured to receive a writing implement or pencil 58, shown in phantom in the drawings. Each of the apertures, in cooperation with the pencil, is operable to inscribe an arc 60 on the inscribable surface 48 of sheet-like member 46 as plate 52 rotates about the axis of rotation. In the preferred embodiments, there are three such apertures designated by numerals 56a, 56b, and 56c. The corresponding arcs inscribed by such apertures are identified by numerals 60a, 60b, and 60c. Each of the apertures 56a, b, and c is located at a different radial distance from the axis of rotation and is angularly displaced from each other.

An overlying transparent plate 62 is fixedly mounted to tablet 12 and is preferably sized and positioned to cover more than half of the rotatable control plate 52. Plate 62 has an opening 64 to permit spindle 36 to extend freely therethrough when the plate is in its mounted position. For the embodiment of FIGS. 1-4, the bottom side edge portions 66 and 68 of plate 62 are secured to the top surfaces of flanges 26 and 28 by an adhesive. The arrangement is such that plate 62 has an upper edge 70 that lies across rotatable plate 52 when plate 62 is mounted to tablet 12.

In use, reference is first made to FIG. 1 wherein it may be assumed that control plate 52 had been rotated to locate aperture 56a adjacent to the plate edge 70 at the beginning of the line inscribable by said aperture. The child then inserts pencil 58 in aperture 56a and rotates plate 52 clockwise, in the direction of the arrow, by manual manipulation of the pencil. Plate 52 is rotated until aperture 56a is located at another position along plate edge 70 which is now at the termination of the line inscribable by the pencil in said aperture, as shown in FIG. 1. Such movement of plate 52 by means of pencil 58 serves to draw the arc 60a on the inscribable surface 48, and also serves to locate the second aperture 56b adjacent to plate edge 70 at the beginning of the line inscribable by said second aperture.

The child now inserts the pencil in aperture 56b and repeats the procedure to draw a second arc 60b on the inscribable surface 48 of sheet-like member 46, as shown in FIG. 6. This serves to locate the third aperture 60c adjacent to plate edge 70 at the beginning of the line inscribable by said third aperture. Once again, the child inserts the pencil in aperture 56c and, in a similar fashion, draws a third arc 60c by rotating plate 52 clockwise until aperture 56c is located adjacent to plate edge 70 at the termination of the line inscribable by said third aperture. This serves to locate aperture 56a back at its original starting position adjacent plate edge 70 wherein the entire process or sequence of drawing the arcs may be repeated.

It will be appreciated that plate edge 70 serves as a stop or limit for movement of pencil 58 which terminates the lines inscribed by the respective apertures 56a, b, and c. As such, the extent or length of the arc drawn is a function of the extent to which overlying plate 62 covers control plate 52. Also, the angular positioning of the apertures is such that when one of the apertures is at a location along the plate edge 70 which defines the termination of the line inscribable by said aperture, another aperture becomes exposed for use by being located along the plate edge 70 at a position which defines the beginning of the line inscribable by said other aperture. Thus, when the first arc is drawn, the child can insert the pencil into the next available aperture to draw another arc.

The result is to permit the child to draw a plurality of concentric arcs on the inscribable surface of the sheet-like member to create a rainbow-like design. While only three apertures are shown, it will be appreciated that the number of such apertures may be varied. It also will be appreciated that since control plate 52 is prevented from rotating in a counterclockwise direction due to the operative orientation of clutch 32, use of apparatus 10 serves to instill a habit in the child of drawing arcs in a clockwise direction. The transparency of plate 52 enables the child to see the arcs being drawn which adds to the satisfaction of the child in using the device.

Since the plate 52 is capable of being rotated in only one direction, the device is, in effect, self-correcting. That is, rotation of the plate can only be in the clockwise direction which is necessary for correct numeral formation.

The device provides positive visual feedback because the child can see the sheet with the arc, or plurality of concentric arcs, drawn thereon. The child, thus, gets an accurate visual perception of the drawn rainbow-like design, as well as a feeling of success.

The device also provides kinesthetic feedback of the desired movement of the plate 52. This is due to the fact that the device has varying degrees of resistance to rotation of the plate dependent on which one of the plate apertures is selected to receive the pencil point. This is because each aperture is located at a different radius or distance from the axis of rotation of the plate. It follows that for a plate of constant mass, the amount of force needed to rotate the plate to overcome the resistance of the clutch decreases as the radius of the selected aperture increases. To the child, the different forces needed to rotate the plate translates into different degrees of resistance which, thus, provide a sensorimotor feedback of the desired plate movement.

Still, further, the ratchet movement of the clutch provides auditory feedback, in the nature of a pleasant clicking sound, to convey to the child that the device is being used correctly. The clicking sound also delights younger children, and makes the activity of using the device fun.

FIG. 5 shows an alternative embodiment of the invention in which overlying plate 62' is fixedly mounted to tablet 12' in the sense that the plate, when mounted, is restrained against further movement while the device is in use. However, plate 62' is removable from tablet 12' for gaining access to the other components of the device. Specifically, the flanges 26, 28 of tablet 12' have a plurality of upstanding pegs 72 which are adapted to be received within complementary shaped openings 74 in overlying plate 62' to facilitate the modified fixed mounting arrangement. The operation of the device otherwise is the same as that previously disclosed.

A closure plate 76 may be included to fit within and cover bore 30 after clutch 32 is inserted in tablet 12 or 12'.

In construction, tablet 12 may be formed of metal, plastic or wood. Transparent plate 52 and overlying plate 62 each may be formed of plastic. The dimensions of the device should be selected as to easy and comfortable for a child to use. For example, tablet 12 may be of rectangular shape having planar dimensions of approximately 9"×12" (22.86 cm×30.48 cm), and a height of 1" (2.54 cm). The height dimension includes the distance from bottom surface 24 to the top of the flanges 26, 28. The height of tablet 12 from the bottom surface to the top support surface is 0.975" (2.22 cm). Plate 52 may be approximately 8" (20.32 cm) in diameter, and have a thickness of 0.125" (0.32 cm). Plate 62 may be of rectangular shape having dimensions of approximately 9"×7" (22.86 cm×17.78 cm).

While preferred embodiments of the invention have been shown and described in detail, it will be readily understood and appreciated that numerous omissions, changes and additions may be made without departing from the spirit and scope of the present invention.

I claim:

1. An educational device for teaching handwriting skills comprising:

a planar tablet having an inscribable surface;

clutch means mounted to said tablet, said clutch means oriented to permit rotation in a predetermined rotational direction about an axis of rotation;

a rotatable control plate mounted to said clutch means for rotation therewith, said control plate positioned above said inscribable surface;

said control plate have a plurality of apertures therethrough, each aperture configured to receive a writing implement operable to inscribe an arc on said inscribable surface beneath said plate as said plate rotates about said axis of rotation;

each of said apertures having a different radial distance from said axis of rotation and being angularly displaced from each of the rest of said apertures; and an overlying plate mounted to said tablet, said overlying plate positioned over and covering at least half of said rotatable plate and having an edge that lies across said rotatable plate;

whereby when the writing implement which is received in a first one of said apertures inscribes an arc on said inscribable surface to locate said first aperture adjacent to the edge of said overlying plate at the termination of the line inscribable by said first aperture, a second one of said apertures is located adjacent to the edge of said overlying plate at the beginning of the line inscribable by said second aperture.

2. The educational device of claim 1, whereby said plurality of apertures are disposed to permit a concentric set of arcs to be inscribed on said inscribable surface.

3. The educational device of claim 2, wherein said clutch means is oriented to permit said arcs to be inscribed only in a clockwise direction.

4. An educational device for teaching handwriting skills comprising:

a planar tablet having a support surface;

a sheet-like member supported on said tablet, said member having an inscribable surface;

clutch means mounted to said tablet, said clutch means oriented to permit rotation in a clockwise direction about an axis of rotation;

a rotatable control plate mounted to said clutch means for rotation therewith, said control plate positioned above the inscribable surface of said sheet-like member;

said control plate having a plurality of apertures therethrough, each aperture configured to receive a writing implement operable to inscribe an arc on the inscribable surface of said sheet-like member beneath said plate as said plate rotates about said axis of rotation;

each of said apertures having a different radial distance from said axis of rotation and being angularly displaced from each of the rest of said apertures; and an overlying plate mounted to said tablet, said overlying plate positioned over and covering more than half of said rotatable plate and having an edge that lies across said rotatable plate;

whereby then the writing implement which is received in a first one of said apertures inscribes an arc on the inscribable surface of said sheet-like member during rotation of said control plate by manual manipulation of the writing implement to locate said first aperture adjacent to the edge of said overlying plate at the termination of the line inscribable by said first aperture, a second one of said apertures is located adjacent to the edge of said overlying plate at the beginning of the line inscribable by said second aperture.

5. The educational device of claim 4, whereby said plurality of apertures are disposed to permit a concentric set of arcs to be inscribed on the inscribable surface of said sheet-like member only in a clockwise direction.

6. The educational device of claim 4, whereby when the last one of said apertures is at the edge of said overlying plate at the termination of the line inscribable by said last aperture, said first aperture is adjacent to the edge of said overlying plate at the beginning of the line inscribable by said first aperture.

7. The educational device of claim 4, wherein said rotatable control plate comprises a planar disc.

8. The educational device of claim 4, wherein said rotatable control plate is transparent.

9. The educational device of claim 8, wherein said overlying plate is fixedly mounted to said tablet and is transparent.

10. The educational device of claim 4, wherein said tablet has raised flanges adjacent edge portions of said support surface, said flanges serving as a guide for locating the sheet-like inscription member o said support surface.

11. The educational device of claim 4, wherein said clutch means includes a clutch and an extending spindle connected to said clutch for rotation therewith, and said control plate is mounted to said spindle for rotation therewith.

12. The educational device of claim 11, wherein said tablet has a bore communicating with said support surface, said clutch being located within said bore with the free end of said spindle projecting above said support surface, and wherein said device further comprises a closure plate configured to fit within and cover said bore.

13. The educational device of claim 12, wherein said spindle has a set of surfaces, and said rotatable control plate has an opening therethrough defined by complementary shaped surfaces configured to receive said spindle and prevent any substantial relative rotation therebetween.

14. The educational device of claim 13, wherein said spindle has an outwardly biased retractable bearing element projecting from one of said surfaces thereof, said element being movable between a projected position and retracted position, the opening of said rotatable control plate being configured to engage said element upon mounting of said plate on said spindle to displace said element to its retracted position, whereupon when said plate is moved past said element, said element returns to its outwardly biased projected position and overlies an edge portion defining said opening to releasably retain said plate in place on said spindle.

15. The educational device of claim 11, wherein said sheet-like member has a cut-out portion configured to permit said spindle to extend freely therethrough when said sheet-like member is supported on said tablet.

16. The educational device of claim 11, wherein said overlying plate has an opening to permit said spindle to extend freely therethrough when said overlying plate is mounted on said tablet.

17. An educational device for teaching handwriting skills comprising:

a planar tablet having a support surface;

clutch means mounted to said tablet, said clutch means comprising a clutch oriented to permit rotation in a clockwise direction about an axis of rotation and an extending spindle connected to said clutch for rotation therewith;

a sheet-like member supported on said tablet, said member having an inscribable surface;

a rotatable transparent control plate mounted on said spindle for rotation therewith, said control plate positioned above the inscribable surface of said sheet-like member;

said control plate having a plurality of apertures therethrough, each aperture configured to received a writing implement operable to inscribe an arc on the inscribable surface of said sheet-like member beneath said plate as said plate rotates about said axis of rotation;

each of said apertures having a different radial distance from said axis of rotation and being angularly displaced from each of the rest of said apertures;

an overlying plate fixedly mounted to said tablet, said overlying plate positioned over and covering more than half of said rotatable plate and having an edge that lies across said rotatable plate;

whereby: (a) when the writing implement which is received in a first one of said apertures inscribes an arc on the inscribable surface of said sheet-like member during rotation of said control plate by manual manipulation of the writing implement to locate said plate at the termination of the line inscribable by said first aperture, a second one of said apertures is located adjacent to the edge of said fixed plate at the beginning of the line inscribable by said second aperture, and (b) when the last one of said apertures is at the edge of said fixed plate at the termination of the line inscribable by said last aperture, said first aperture is adjacent to the edge of said fixed plate at the beginning of the line inscribable by said first aperture.

18. The educational device of claim 17, whereby said plurality of apertures are disposed to permit a concentric set of arcs to be inscribed on the inscribable surface of said sheet-like member only in a clockwise direction.

* * * * *